(12) United States Patent
Lee et al.

(10) Patent No.: US 8,295,672 B2
(45) Date of Patent: Oct. 23, 2012

(54) VIDEO RECORDER AND METHOD FOR DETECTING SOUND OCCURRENCE

(75) Inventors: Da-Long Lee, Taipei Hsien (TW); Pi-Jye Tsaur, Taipei Hsien (TW)

(73) Assignee: Hon Hai Precision Industry Co., Ltd., Tu-Cheng, New Taipei (TW)

(*) Notice: Subject to any disclaimer, the term of this patent is extended or adjusted under 35 U.S.C. 154(b) by 404 days.

(21) Appl. No.: 12/732,148

(22) Filed: Mar. 25, 2010

(65) Prior Publication Data

US 2011/0097054 A1    Apr. 28, 2011

(51) Int. Cl.
*H04N 5/91* (2006.01)
(52) U.S. Cl. ...................................................... 386/227
(58) Field of Classification Search .................. 386/249, 386/227, 228, 338
See application file for complete search history.

(56) References Cited

U.S. PATENT DOCUMENTS

| | | | |
|---|---|---|---|
| 5,604,551 A * | 2/1997 | Choi et al. | 396/58 |
| 6,519,416 B1 * | 2/2003 | Choi et al. | 386/228 |
| 7,336,792 B2 * | 2/2008 | Sasaki | 381/17 |
| 2004/0223623 A1 * | 11/2004 | Lo | 381/92 |
| 2011/0054890 A1 * | 3/2011 | Ketola et al. | 704/231 |

* cited by examiner

*Primary Examiner* — Thai Tran
*Assistant Examiner* — Sunghyoun Park
(74) *Attorney, Agent, or Firm* — Altis Law Group, Inc.

(57) ABSTRACT

A video recorder includes a sound occurrence detection system to detect a sound occurrence in an area. A detection method can detect the sound occurrence by using the video recorder. The detection method establishes relationships between rotation angles of the video recorder and sound output orientations of a sound source in the area. Furthermore, the detection method determines a rotation angle according to the relationships once the sound occurrence occurs, and rotates the video recorder according to the rotation angle, to record videos and sounds of a sound source that causes the sound occurrence.

9 Claims, 5 Drawing Sheets

VIDEO RECORDER AND METHOD FOR DETECTING SOUND OCCURRENCE

BACKGROUND

1. Technical Field

Embodiments of the present disclosure generally relate to video systems, and more particularly to a video recorder and a method for detecting a sound occurrence in an area where the video recorder is used.

2. Description of Related Art

A video recorder, in normal use, refers to a device that records videos and sounds in a digital format to a disk drive or other memory medium. Video recorders often will be used to monitor an area by recording videos and sounds in the area.

However, a conventional video recorder can only record videos and sounds of objects that are located in a immovable working area of the video recorder. It cannot automatically record videos and sounds of objects that are not located in the immovable working area. Such kind of video recorder is thus less functional than otherwise desired, leading to failure to obtain some recordings for some videos and sounds occurrences in a monitored area.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, each "step" described below, is operative under the controlling of a corresponding "module." The word "module," as described herein, refers to logic embodied in hardware or firmware, or to a collection of software instructions, written in a programming language, such as, for example, Java, C, or Assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
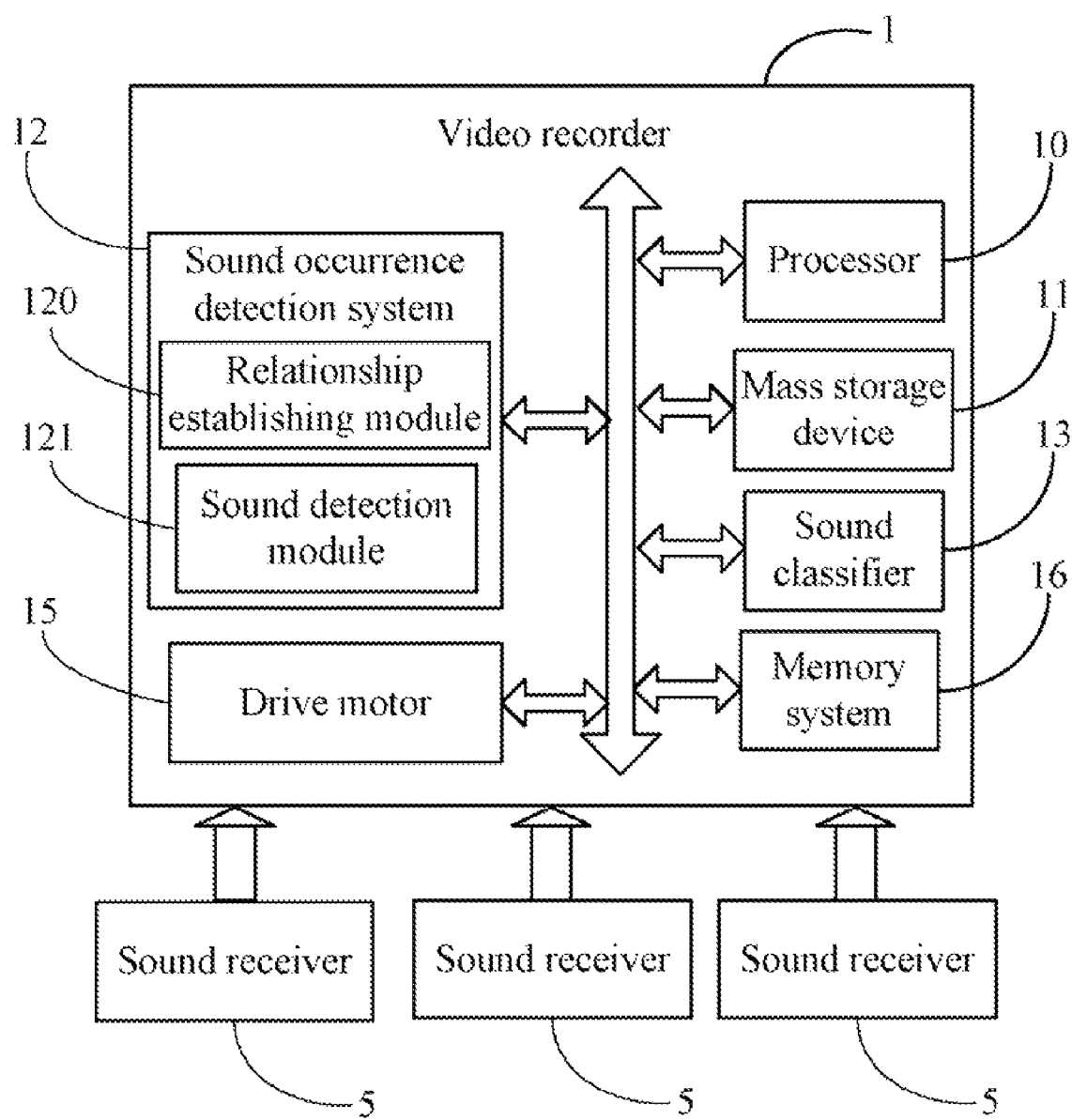
FIG. 1 is a block diagram of one embodiment of a video recorder for detecting a sound occurrence in an area.

FIG. 1 is a block diagram of one embodiment of a video recorder 1. The video recorder 1 may include a sound occurrence detection system 12, a sound classifier 13, and a drive motor 15. The sound occurrence detection system 12 may be used to monitor an area by detecting a sound occurrence in the area. In the embodiment, at least three sound receivers 5 are set around the video recorder to receive the sound occurrence.

In the embodiment, the sound classifier 13 includes a plurality of sound classes. Sound representative characters of one of the sound classes can be determined by a prerecorded sound class. The classification accuracy of the sound classifier 13 mostly depends on sound sample data used during the prerecorded sound class. If the sound sample data of each sound class can be collected completely, the sound classifier 13 has better classification accuracy. The sound classifier 13 can classify a sound received from the three sound receivers 5 if the sound belongs to one of the plurality of sound classes.

In the embodiment, the drive motor 15 is controlled by the sound occurrence detection system 12 to rotate the video recorder 1, to record videos and sounds of a sound source.

In the embodiment, the sound occurrence detection system 12 includes a relationship establishing module 120 and a sound detection module 121. The relationship establishing module 120 establishes a relationship between a rotation angle of the video recorder 1 and a sound output orientation of each sound source in the area.

The sound detection module 121 determines a current sound output orientation of a sound occurrence in the area. Furthermore, the sound detection module 121 determines a current rotation angle of the video recorder 1 according to an established relationship related to the current sound output orientation. In addition, the sound detection module 121 controls the drive motor 15 to rotate the video recorder 1 according to the current rotation angle, to record videos and sounds of a sound source that causes the sound occurrence.

In the embodiment, the video recorder 1 may include a memory system 16, such as a random access memory (RAM) for temporary storage of information and/or a read only memory (ROM) for permanent storage of information, and/or a mass storage device 11, such as a hard drive, or optical media storage device. The mass storage device 11 may comprise one or more hard disk drives, optical drive, networked drive, or some combination of various digital storage systems. In the embodiment, the mass storage device 11 may store the sound occurrence detection system 12, sound data, and needed data generated by the sound occurrence detection system 12. The video recorder 1 also includes at least one processor 10 for computation during the process of detecting sound occurrences in the area. The memory system 16 or the mass storage device 11 may include one or more function modules to implement the sound occurrence detection system 12. The above mentioned components may be coupled by one or more communication buses or signal lines. It should be apparent that FIG. 1 is only one example of an architecture for the video recorder 1 that can be included with more or fewer components than shown, or a different configuration of the various components.

The video recorder 1 is generally controlled and coordinated by an operating system, such as the UNIX, Linux, Windows 95, 98, NT, 2000, XP, Vista, Mac OS X, an embedded operating system, or any other compatible operating systems. In other embodiments, the video recorder 1 may be controlled by a proprietary operating system.

Figure 2:
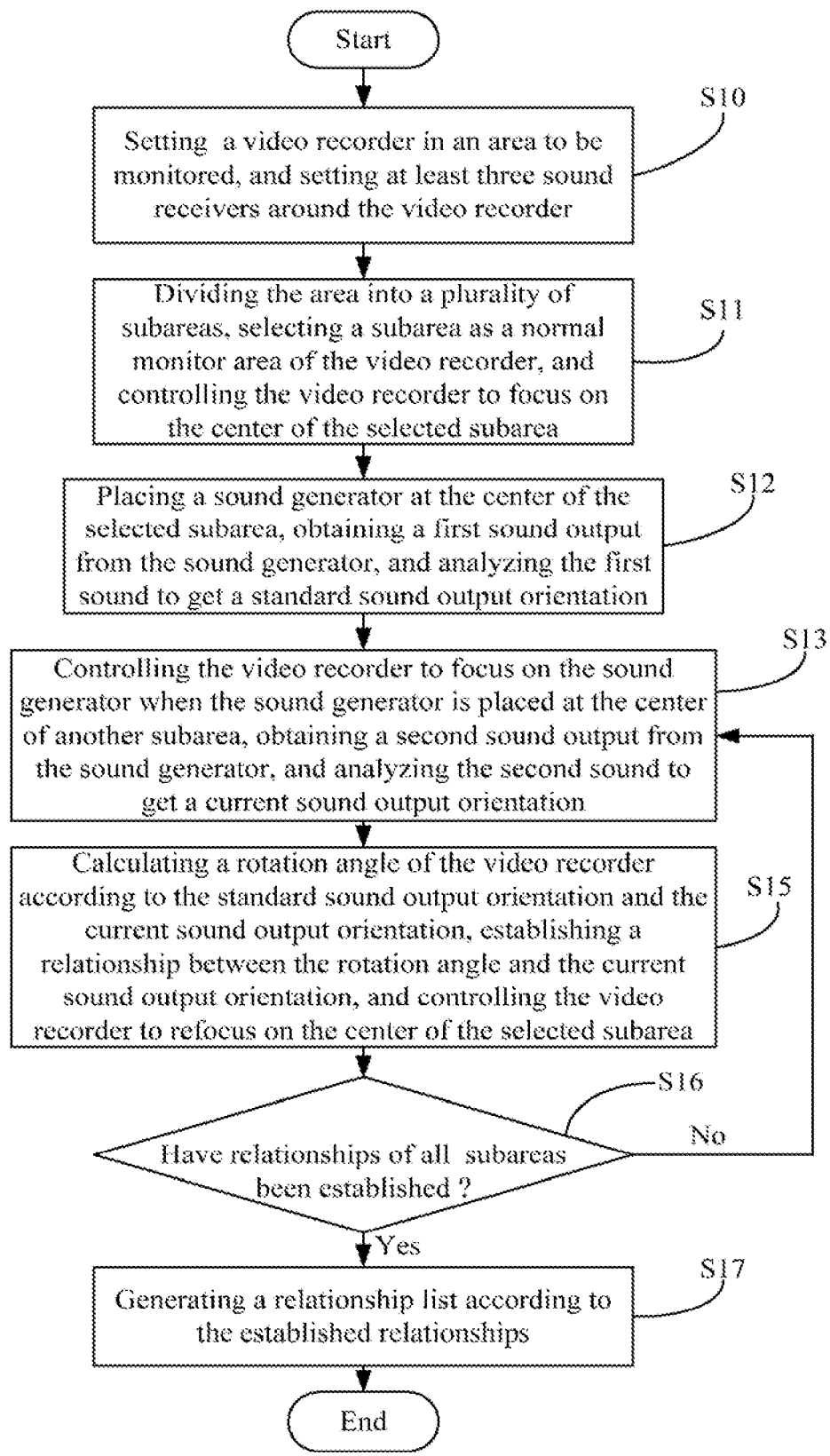
FIG. 2 is a flowchart illustrating one embodiment of a method for establishing a relationship list used by a video recorder.

FIG. 2 is a flowchart illustrating one embodiment of a method for detecting a sound occurrence in an area through the video recorder 1. In the embodiment, the sound occurrence detection system 12 comprises one or more computerized codes that are stored in the sound occurrence detection system 12 and executable by the at least one processor 10 of the video recorder 1 to perform the method.

Figure 3:
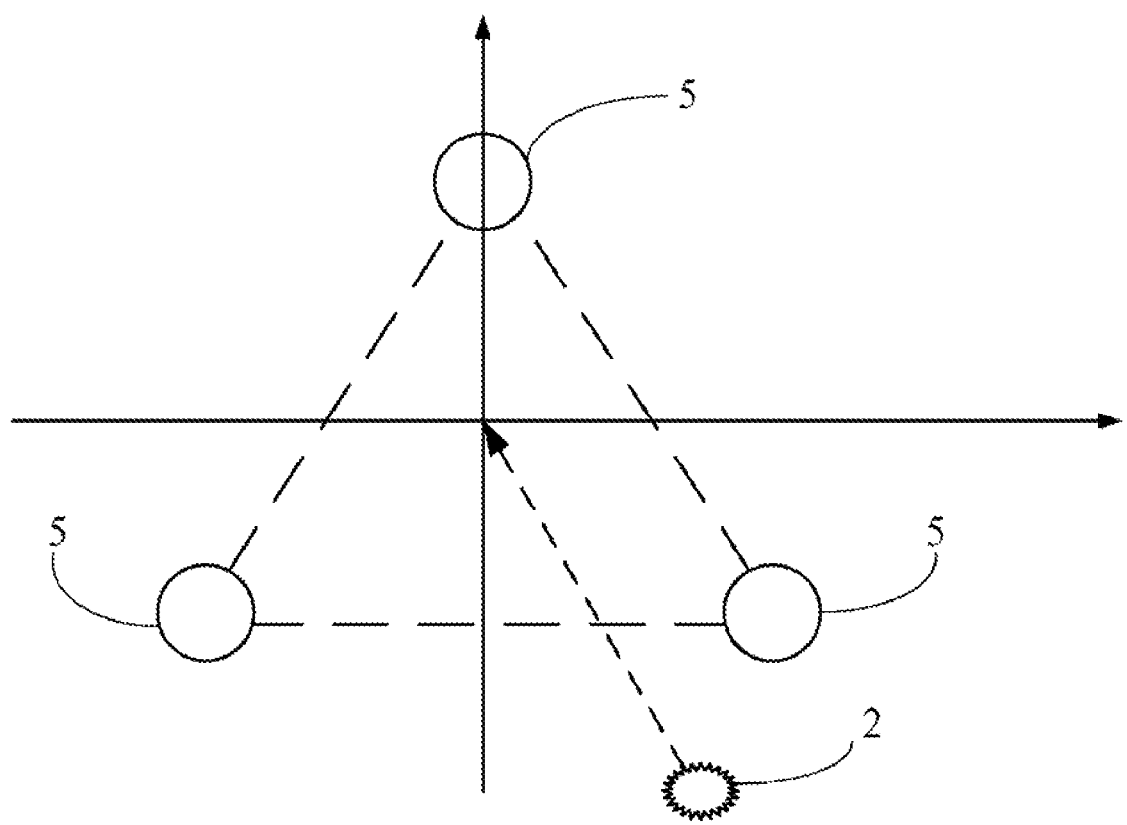
FIG. 3 illustrates one embodiment of determining a sound output orientation of a sound occurrence.

In block S10, the video recorder 1 is set in an area to be monitored, and the three sound receivers 5 are set around the video recorder 1. For example, as shown in FIG. 3, locations of three sound receivers 5 forms a triangle, and the sound output orientation of a sound generator 2 is determined according to a sequence and time differences that the three sound receivers 5 receive a sound of the sound generator 2.

Figure 4:
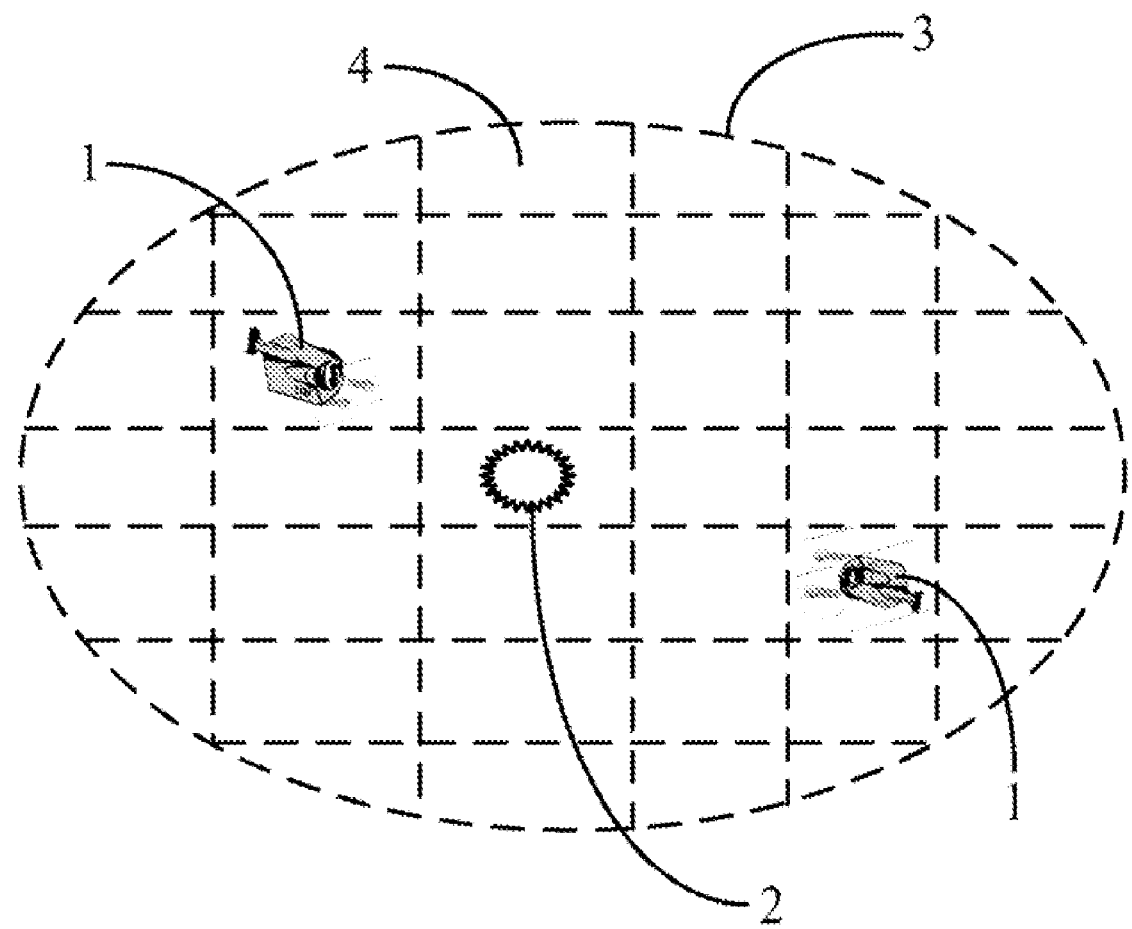
FIG. 4 illustrates one embodiment of dividing an area into a plurality of subareas to detect a sound occurrence.

In block S11, the relationship establishing module 120 divides the area into a plurality of subareas, and selects a subarea as a normally monitored area of the video recorder 1. Furthermore, the relationship establishing module 120 controls the video recorder 1 to focus on the center of the selected subarea. For example, as shown in FIG. 4, the area 3 is divided into a plurality of subareas 4.

In block S12, the relationship establishing module 120 places the sound generator 2 at the center of the selected subarea, obtains a first sound output from the sound generator 2, and analyzes the first sound to get a standard sound output orientation.

In block S13, the relationship establishing module 120 controls the video recorder 1 to focus on the sound generator 2 when the sound generator 2 is placed at the center of another subarea. Furthermore, the relationship establishing module 120 obtains a second sound output from the sound generator 2, and analyzes the second sound to get a current sound output orientation.

In block S15, the relationship establishing module 120 calculates a rotation angle of the video recorder 1 according to the standard sound output orientation and the current sound output orientation. Furthermore, the relationship establishing module 120 establishes a relationship between the rotation angle and the current sound output orientation, and controls the video recorder 1 to refocus on the center of the selected subarea.

In block S16, the relationship establishing module 120 analyzes whether relationships of all the subareas have been established.

If the relationships of all the subareas have been established, block S17 is implemented. If a relationship of a subarea has not been established, block S13 is repeated.

In block S17, the relationship establishing module 120 generates a relationship list according to established relationships.

Figure 5:
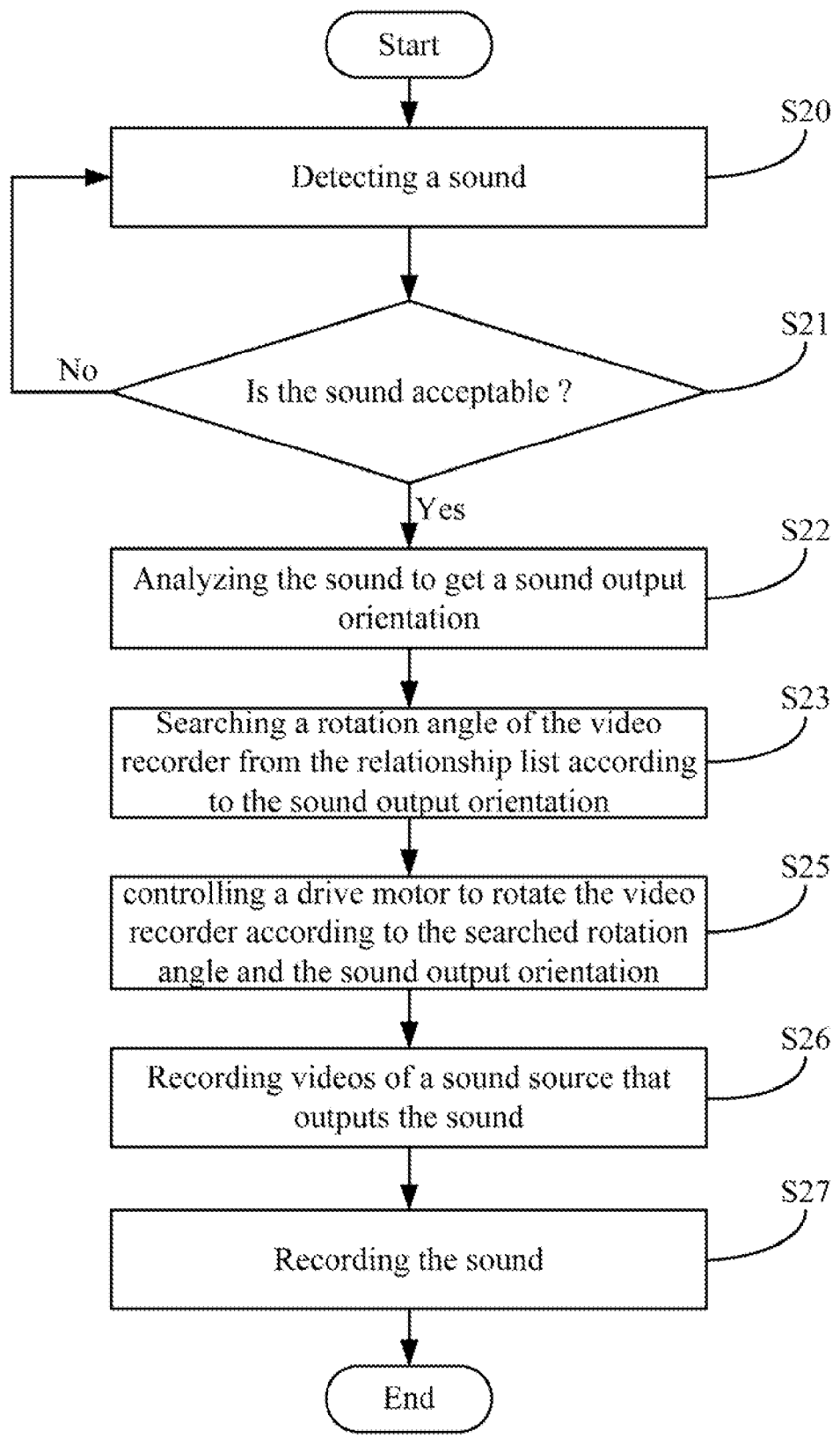
FIG. 5 is a flowchart illustrating one embodiment of a method for detecting a sound occurrence in an area through the relationship list of FIG. 2.

FIG. 5 is a flowchart illustrating one embodiment of a method for detecting a sound occurrence in the area through the relationship list.

In block S20, the sound detection module 121 detects a sound of the sound occurrence in the area by the at least three sound receivers 5.

In block S21, the sound detection module 121 analyzes whether the detected sound is acceptable by the sound classifier 13 of the video recorder 1. In the embodiment, the sound detection module 121 analyzes that the detected sound is acceptable, by analyzing if the detected sound belongs to a sound class of the sound classifier 13. Otherwise, the sound detection module 121 analyzes that the detected sound is unacceptable, by analyzing if the detected sound does not belong to a sound class of the sound classifier 13.

If the detected sound is acceptable, block S22 is implemented. If the detected sound is unacceptable, block S20 is repeated.

In block S22, the sound detection module 121 analyzes the detected sound to get the current sound output orientation.

In block S23, the sound detection module 121 determines a current rotation angle of the video recorder 1, by searching a established relationship related to the current sound output orientation from the relationship list.

In block S25, the sound detection module 121 controls the drive motor 15 to rotate the video recorder 1 according to the current rotation angle.

In block S26, the sound detection module 121 controls the video recorder 1 to record videos of a sound source that causes the sound occurrence.

In block S27, the sound detection module 121 controls the video recorder 1 to record the sound of the sound source.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A video recorder, comprising:
    at least one storage system and at least one processor; and
    a sound occurrence detection system stored in the at least one storage system, and being executable by the at least one processor to monitor an area;
    the sound occurrence detection system comprising:
    a relationship establishing module operable to establish a relationship between a rotation angle of the video recorder and a sound output orientation of each sound source in the area; and
    a sound detection module operable to determine a current sound output orientation of a sound occurrence in the area, and a current rotation angle of the video recorder according to an established relationship related to the current sound output orientation, and control a drive motor of the video recorder to rotate the video recorder according to the current rotation angle to record videos and sounds of a sound source that causes the sound occurrence;
    wherein the relationship establishing module is further operable to:
    (a) divide the area into a plurality of subareas, select a subarea as a normal monitor area of the video recorder, and control the video recorder to focus on the center of the selected subarea;
    (b) place a sound generator at the center of the selected subarea, obtain a first sound output from the sound generator, and analyze the first sound to get a standard sound output orientation;
    (c) control the video recorder to focus on the sound generator when the sound generator is placed at the center of another subarea, obtain a second sound output from the sound generator, and analyze the second sound to get a current sound output orientation;
    (d) calculate a rotation angle of the video recorder according to the standard sound output orientation and the current sound output orientation, establish a relationship between the rotation angle and the current sound output orientation, and control the video recorder to refocus on the center of the selected subarea;
    (e) repeating the steps of (c) and (d) until relationships of all the subareas have been established; and
    (f) generate a relationship list according to all established relationships.

2. The video recorder as described in claim 1, wherein at least three sound receivers are set around the video recorder, and the sound output orientation of each sound source is determined according to a sequence and time differences that the at least three sound receivers receive a sound.

3. The video recorder as described in claim 1, wherein the sound detection module is further operable to:
    detect a sound of the sound occurrence in the area;

analyze whether the detected sound is acceptable by a sound classifier of the video recorder;
analyze the detected sound to get the current sound output orientation, if the detected sound is acceptable; and
determine the current rotation angle according to an established relationship related to the current sound output orientation.

4. A method for detecting a sound occurrence in an area through a video recorder, the method comprising:
(i1) establishing a relationship between a rotation angle of the video recorder and a sound output orientation of each sound source in the area;
(i2) determining a current sound output orientation of a sound occurrence in the area, and determining a current rotation angle of the video recorder according to an established relationship related to the current sound output orientation; and
(i3) controlling a drive motor of the video recorder to rotate the video recorder according to the current rotation angle, to record videos and sounds of a sound source that causes the sound occurrence
wherein the step (i1) comprises:
(a) dividing the area into a plurality of subareas, selecting a subarea as a normal monitor area of the video recorder, and controlling the video recorder to focus on the center of the selected subarea;
(b) placing a sound generator at the center of the selected subarea, obtaining a first sound output from the sound generator, and analyzing the first sound to get a standard sound output orientation;
(c) controlling the video recorder to focus on the sound generator when the sound generator is placed at the center of another subarea, obtaining a second sound output from the sound generator, and analyzing the second sound to get a current sound output orientation;
(d) calculating a rotation angle of the video recorder according to the standard sound output orientation and the current sound output orientation, establishing a relationship between the rotation angle and the current sound output orientation, and controlling the video recorder to refocus on the center of the selected subarea;
(e) repeating the steps of (c) and (d), until relationships of all the subareas have been established; and
(f) generating a relationship list according to established relationships.

5. The method as described in claim 4, wherein at least three sound receivers are set around the video recorder, and the sound output orientation of each sound source is determined according to a sequence and time differences that the at least three sound receivers receive a sound.

6. The method as described in claim 4, wherein the step (i2) comprises:
detecting a sound of the sound occurrence in the area;
analyzing whether the detected sound is acceptable by a sound classifier of the video recorder;
analyzing the detected sound to get the current sound output orientation, if the detected sound is acceptable; and
determining the current rotation angle according to an established relationship related to the current sound output orientation.

7. A non-transitory storage medium having stored thereon instructions that, when executed by a processor of a video recorder, causing the video recorder to perform a method for detecting a sound occurrence in an area, wherein the method comprises:
(i1) establishing a relationship between a rotation angle of the video recorder and a sound output orientation of each sound source in the area;
(i2) determining a current sound output orientation of a sound occurrence in the area, and determining a current rotation angle of the video recorder according to an established relationship related to the current sound output orientation; and
(i3) controlling a drive motor of the video recorder to rotate the video recorder according to the current rotation angle, to record videos and sounds of a sound source that causes the sound occurrence;
wherein the step (i1) comprises:
(a) dividing the area into a plurality of subareas, selecting a subarea as a normal monitor area of the video recorder, and controlling the video recorder to focus on the center of the selected subarea;
(b) placing a sound generator at the center of the selected subarea, obtaining a first sound output from the sound generator, and analyzing the first sound to get a standard sound output orientation;
(c) controlling the video recorder to focus on the sound generator when the sound generator is placed at the center of another subarea, obtaining a second sound output from the sound generator, and analyzing the second sound to get a current sound output orientation;
(d) calculating a rotation angle of the video recorder according to the standard sound output orientation and the current sound output orientation, establishing a relationship between the rotation angle and the current sound output orientation, and controlling the video recorder to refocus on the center of the selected subarea;
(e) repeating the steps of (c) and (d), until relationships of all the subareas have been established; and
(f) generating a relationship list according to established relationships.

8. The non-transitory storage medium as described in claim 7, wherein at least three sound receivers are set around the video recorder, and the sound output orientation of each sound source is determined according to a sequence and time differences that the at least three sound receivers receive a sound.

9. The non-transitory storage medium as described in claim 7, wherein the step (i2) comprises:
detecting a sound of the sound occurrence in the area;
analyzing whether the detected sound is acceptable by a sound classifier of the video recorder;
analyzing the detected sound to get the current sound output orientation, if the detected sound is acceptable; and
determining the current rotation angle according to an established relationship related to the current sound output orientation.

* * * * *

UNITED STATES PATENT AND TRADEMARK OFFICE
CERTIFICATE OF CORRECTION

PATENT NO. : 8,295,672 B2  
APPLICATION NO. : 12/732148  
DATED : October 23, 2012  
INVENTOR(S) : Lee et al.

Page 1 of 1

It is certified that error appears in the above-identified patent and that said Letters Patent is hereby corrected as shown below:

Title Page insert Item (30) "Foreign Application Priority Data"

--(30)     Foreign Application Priority Data

Oct. 26, 2009   (CN) .........................200910308812.1--

Signed and Sealed this  
Fifteenth Day of October, 2013

Teresa Stanek Rea  
*Deputy Director of the United States Patent and Trademark Office*